Aug. 17, 1937.   W. F. ZIMMERMANN   2,090,507
SHAPER TOOL LIFTER
Filed Aug. 1, 1936   2 Sheets-Sheet 1
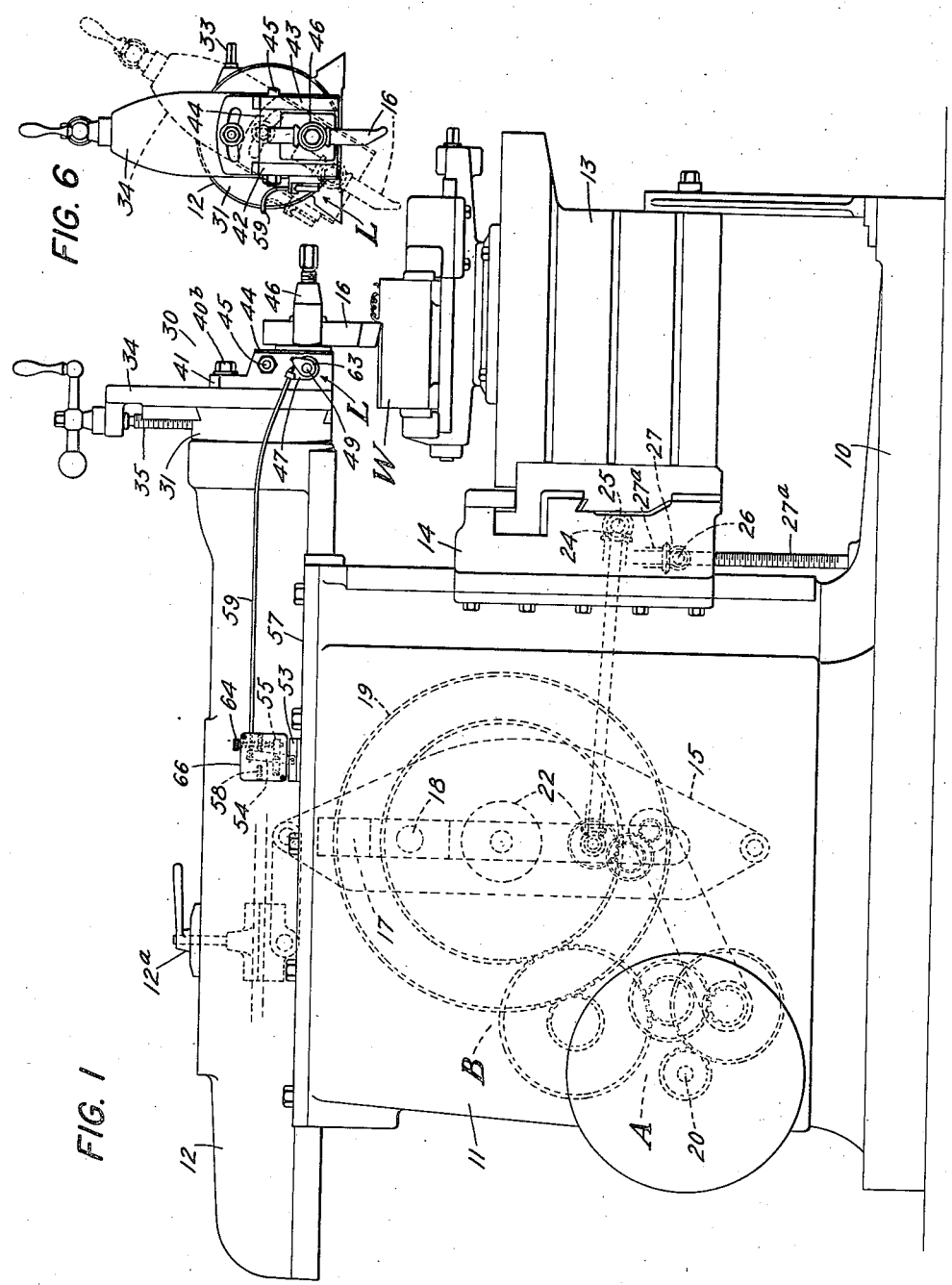
INVENTOR
William F. Zimmermann
BY
Albert F. Nathan
ATTORNEY

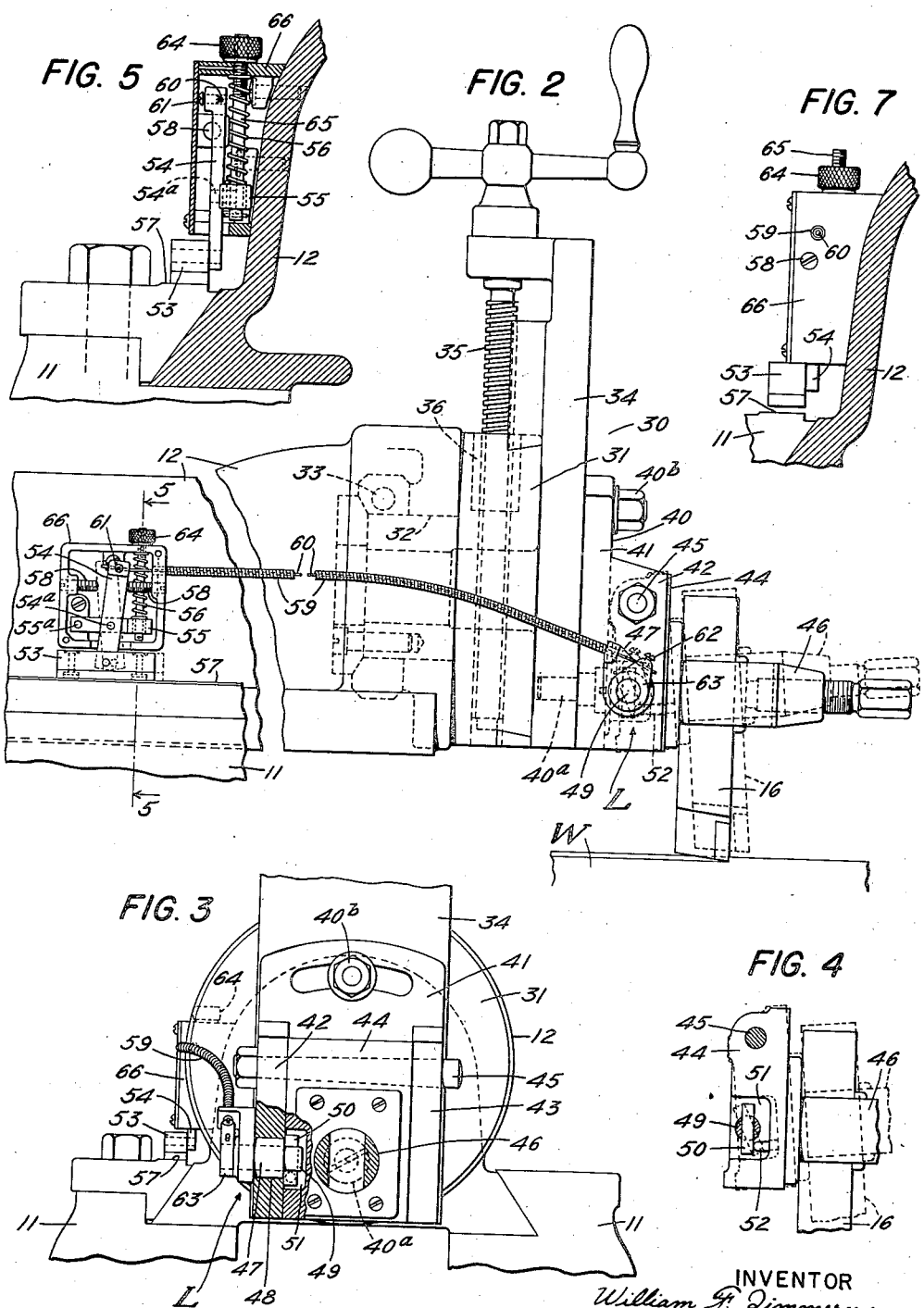

Patented Aug. 17, 1937

2,090,507

UNITED STATES PATENT OFFICE 2,090,507

SHAPER TOOL LIFTER

William F. Zimmermann, Maplewood, N. J., assignor to Gould & Eberhardt, Newark, N. J., a corporation of New Jersey Application August 1, 1936, Serial No. 93,793

7 Claims. (Cl. 90—55)

The invention relates to machine tools and more particularly to improvements in tool lifting mechanisms for shaping machines.

In the conventional shaping machine, the tool is supported at the front end of the ram in a clapper-box and is reciprocated more or less rapidly across the workpiece to be machined. The path of movement of the tool point is in a straight line, and to present the tool to new portions of the workpiece, the workpiece is shifted laterally, between cutting strokes, in a step-by-step manner. New areas therefore come under the tool point at each forward stroke. To prevent the tool from digging-in to the new areas or cutting on its return movement, the clapper-box was devised which allowed the tool to ride over the top of the work.

The usual clapper-box consists of two elements, a bearing plate member, which is secured in fixed relation to the forward end of the horizontally disposed ram, and the hinged clapper member which carries the tool post and tool. The clapper member normally hangs vertically from its pivot and rests with its rear face in engagement with the front surface of the bearing plate. When the ram is moving forward on its power stroke, inertia as well as gravity, holds the clapper against the supporting plate. On reversing the ram movement, inertia lifts the clapper away from the supporting plate and the tool is free to elevate as it is being drawn back over the surface of workpiece.

At comparatively slow speeds, this back-tracking of the tool on the work was not objectionable since the tool did not swing very far outward at the end of the forward stroke and rested comparatively lightly upon the unfinished region as it was drawn rearwardly. As the shaper speeds increased, however, the arc of swing of the clapper member and tool increased, and the point was soon reached where it became objectionable to allow the tool to drop back upon the unfinished area of the work or to be dragged along the work on the return or idle stroke.

The newer alloys and steels, such as cemented tungsten carbide, now extensively used in cutting tools, further complicated the problem because although they were notably strong and held their cutting edges under very high temperatures, they were peculiarly sensitive to breakage if tracked upon the work on the return stroke of the tool.

A primary aim of this invention is to prevent abuse of that nature to the tool or workpiece and to render available a shaping machine in which the tool is forcibly lifted at the end of each forward stroke and positively restrained from falling or engaging the workpiece on the return stroke of the shaper ram.

A further object of this invention is to provide a tool lifting mechanism capable of lifting the tool at the end of each cutting stroke under any one of an infinite range of adjustments that may be given to the tool to suit the particular character of the operation. Ordinarily, the workpiece, on a shaper, is adjusted vertically toward or away from the tool to the required position. There are occasions, however, particularly when the depth of cut to be taken must carefully be measured, or when a down-feed movement is given to the tool, that the tool slide itself is adjusted vertically. This movement raises or lowers the tool point and the entire clapper box unit, and if the control and timing of the operation of the tool lifting device is derived from the relative movement between the ram and the machine frame, the mechanism must be arranged to transmit its power to a member that may occupy any one of a number of different positions in space.

Likewise, shaping machine tool heads are usually adjustable angularly about the longitudinal axis of the ram, and this introduces another type of movement to the clapper box unit that must be considered in the designing and operation of a tool lifting device. The present invention further aims to provide a tool lifting device and control mechanism, therefore, that is inherently capable of transmitting its impulses around curves or bends thereby to lift and lower the tool irrespective of the angular or vertical position the clapper-box may assume relative to the ram proper.

A further aim of the present invention is to render available a mechanism that will operate automatically to lift the tool clear of the workpiece on the return or idle stroke of the ram and automatically to lower the tool to its normal operating position at the beginning of the forward movement or cutting stroke of the ram, and a device that automatically adjusts itself to the operating speed of the ram, its operating range of movement and its length of stroke, without attention or supervision.

The invention further aims to provide an automatically operative tool lifting device of simple rugged construction, devoid of complicated mechanisms or parts difficult to manufacture or to maintain, and a device that will require the minimum of attention to adjust to suit the particular conditions or character of the installation. And by way of additional improvements, the invention aims to provide a tool lifting mechanism that may quickly be applied to existing machines with a minimum of expense and without materially altering or changing the conventional shaping machine parts, and when applied requires no further adjustment or manipulation of parts when the length of ram stroke is changed or when the speed or rate of reciprocation of the ram is changed.

In attaining the objectives of this invention, it is proposed to raise and lower the tool by a simple mechanism carried by the clapper-box proper and movable bodily therewith, and located preferably on the side away from the operating side of the machine so as not to interfere with the tooling operation or the adjusting means for the angular or vertical position. The invention further proposes to provide a control mechanism for the tool lifting device actuated by the relative movement between the ram or its actuating means and a stationary part of the main frame of the machine, so constructed and arranged as automatically to adjust itself to the length of ram stroke or its range of reciprocatory movement. Inasmuch as the tool head must be capable of vertical as well as angular adjustment, this invention further proposes the use of a flexible power transmitting connection between the head mounted tool lifter and its control means whereby the head of the shaper is kept free of bulky mechanism, while nevertheless, is freely adjustable angularly and radially to all normal operating position.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a side elevational view of a shaping machine with the tool lifting device illustrated thereon.

Fig. 2 is an enlarged view of the head and front portion of the ram showing the preferred form of tool lifting mechanism on a larger scale.

Fig. 3 is a front view of Fig. 2, partly in section.

Fig. 4 is a detail view of the clapper block, and a form of head mounted means for raising and lowering the clapper.

Fig. 5 is a section along line 5—5 of Fig. 2.

Fig. 6 is fragmentary front view of the head, illustrating in dotted lines an angular position.

Fig. 7 is a side view of the friction actuating device adjusted to an inoperative position.

Referring more particularly to Fig. 1, the shaping machine there illustrated is typical and comprises a main frame 10 and 11, a ram 12 reciprocally mounted on ways at the top of said frame, and a table 13 which is laterally adjustable on a vertically adjustable saddle 14.

The ram 12 carries at its forward end a tool head 30 and is reciprocated to and fro across the work, as is common in machines of this character. The means for effecting movement of the ram comprises essentially a rocker arm 15, pivoted at one end to the ram 12 by adjustable range varying means 12$^a$, and at the other end to the machine frame 11, adapted when oscillated to advance and retract the ram tool 16 carried at the forward end thereof. The rocker arm 15 is formed with a longitudinal slot 17 within which an adjustable pivot pin 18 operates. The pivot is radially adjustable on a large power driven bull gear 19, the greater the radius of swing given to the pivot pin, the longer is the stroke of reciprocation of the ram, and conversely. The large gear wheel 19 is driven from an initial power shaft 20 through change gears indicated generally at A and B which give, in this example, eight different speeds to the ram.

The work table 13 is laterally movable upon a vertically adjustable cross-rail or saddle member 14, by hand or power. The power feed mechanism is indicated generally at 22, which it will be understood is operated intermittently and in synchronism with the revolution of the bull gear 19 and reciprocations of the ram, to index the table laterally a unit distance between each two forward strokes of the ram.

A reverser 24 is provided on the table cross feed shaft 25 whereby the table may be intermittently moved in either direction. Levers (not shown) control the direction and rate of table movement. For adjusting the table vertically, a manually operable shaft 26 is provided which through the medium of bevel gears indicated at 27 and screw and nut means 27$^a$ may be actuated to elevate or lower the cross-rail 14 to position the table and workpiece W carried thereon the proper distance from the tool head of the machine.

The tool head 30 is carried at the forward end of the ram and comprises, in the embodiment disclosed in Fig. 2, a revolvable head member 31 which is mounted to rotate in bearings 32 provided by the ram on an axis parallel to the path of reciprocation. Clamp means indicated at 33 are provided for firmly clamping the head 31 in the desired angular adjusted position.

The head 31 is provided at its forward side with guideways for translatably supporting a tool slide 34 that supports a clapper-box 40 and tool. The slide 34 is adjustable diametrically of the head 31 by a screw 35 and nut means 36. Normally, the head 31 is positioned so that translation of the slide is in a vertical path in order to facilitate adjustment of the tool for depth of cut. There are many operations, however, where it is necessary to cut outside of the median vertical plane of the machine, as for cutting key-ways, and to be similarly adjusted, the angular adjustment of the head previously mentioned is necessary.

At the front face of the tool slide, the clapper-box 40 is mounted for a limited angular movement about a pivot 40$^a$, a clamp screw 40$^b$ being provided for clamping the box firmly in the desired position. The clapper-box comprises a supporting plate member 41 which is provided with two spaced and forwardly projecting guide flanges 42 and 43, between which the clapper member 44 is hingedly supported at its upper end. A pivot pin 45 passes through the flanges 42 and 43 and the clapper and which, assisted by the flanges, effectively resists the laterally acting forces of the tooling operation to which the tool is subjected, and maintains the tool accurately in position.

The cutting tool 16 is carried in a tool post 46, on the clapper 44 in the usual manner, and is thereby permitted to swing forward and upward about the axis of the pivot pin 45 at the end of the cutting stroke and during the return movements of the ram.

In the normal operation of the machine, the operator first mounts a workpiece W upon the table 13, sets the tool 16 for the proper cut and then starts the machine. The ram is propelled forward in the usual manner and the tool removes a portion of the workpiece. During the forward movement of the ram and tool, the table and workpiece are held stationary, but during the return movement of the ram and tool and before the next stroke is started, the table and workpiece are indexed laterally so that the tool will remove a new portion of the workpiece. During the return stroke of the ram, the tool, due to the pivotal mounting afforded by the clapper-box, was heretofore allowed to fall upon the work-piece and back-track along the surface and no cutting was intended. When the tool cleared the work on its return stroke it again dropped in position against the bearing plate and was ready for the next cutting stroke. The cycle is repeated again and again until the surface of the workpiece is planed off to the dimensions required.

With the coming of higher speeds of reciprocation, more sudden became the reversals of the ram, and in consequence a greater swinging movement of the clapper occurs than occurred at the slower speeds. On the back stroke of the ram, the tool, if it has not already fallen to its normal position, frequently drops with a severe impact upon the surface of the workpiece. Tool points are broken and the workpiece badly scored for this reason.

The newer steels and alloys in wide use today, though they have revolutionized machining methods, are rather sensitive to breakage when dropped or tracked on the work on the return movement, and when shaping machines must now operate in the range of 200 strokes per minute, it is important to insure that the tool will be lifted a limited distance and definitely prevented from striking the work on the return stroke.

Attempts have been made in the past to solve that problem but which have been unsatisfactory for the reason that they could not be relied upon to lift and lower the tool with the speed or frequency demanded in high speed shappers; and certain constructions were mounted on the head and greatly interfered with the operation of the machine, or with the means of giving the required adjustment to the clapper-box.

The aim of the present invention is to overcome these and other disadvantages of the prior devices. Referring more specifically to Figs. 2 and 3, a preferred form of tool lifting and holding device is indicated generally by the letter L, and is carried by the clapper-box 40.

The lifting mechanism, per se, may assume varied forms, a preferred and easily constructed form possessing many advantages comprises a sleeved bracket member 47 keyed, or otherwise secured against rotation, in a bore 48 formed in the flange 42 of the clapper-box. The sleeve 47, provides a bearing for a short shaft 49, upon the inner end of which, a laterally projecting cam or actuating element 50 is secured.

The clapper member 44, overlies the actuating device and is formed with a recess 51 to accommodate the actuator element 50 when the clapper is seated on the front face of the bearing plate 41, as when during a forward power stroke. A supplemental pin 52 is carried by the clapper member, which projects into the plane of rotation of the actuating element 50 and is engaged thereby. Thus, when the shaft 49 is turned or oscillated, the projection 50 engages the pin 52 and moves the clapper member away from the bearing plate 41. Swinging the clapper member in this manner, positively moves the tool point forwardly and upwardly, and the degree of oscillation given to the rock-shaft determines the distance the tool will be elevated. If at any time the operator wishes to lift the tool manually, the device, it will be seen, is so arranged that he may do so without any difficulty.

An important feature of the invention resides in the means whereby oscillation of the shaft 49 is caused to occur in timed relation with the ram movements, and only at the end of each stroke. A preferred form of device for accomplishing that purpose is disclosed in Fig. 2, and comprises a friction shoe 53 that is pivotally mounted to one end of a floating lever 54. The lever 54 in turn is pivoted at 54ᵃ, to a tension lever 55 pivoted at 55ᵃ, to the ram. The opposite end of the tension lever 55 engages a compression spring 56 set to exert a downward force on the tension lever and on the friction shoe 53.

As illustrated in Fig. 5, the levers and parts just mentioned are mounted upon the side of the ram 12 in such manner that the friction shoe element 53 overlies and frictionally engages the relatively long upper surface 57 of the main frame of the machine. As the ram moves forward the friction shoe lags behind, thus tilting the opposite end of the floating lever 54 clockwise; as the ram moves rearwardly, the friction shoe again lags behind and tilts the end of the lever 54 in the opposite direction. The amount of tilting of the lever permitted is determined by set screws 58 disposed one at each side of the floating lever.

It is proposed to utilize the tilting motions imparted to the floating lever by the movement of the ram relative to the main frame, to oscillate the actuator mounted in the clapper box. A rigid link connection between the two mechanisms, it will be seen, is not feasible owing to the various positions, both vertically and angularly, the clapper-box may assume. The present invention contemplates a tool lifting device operative in all positions of adjustment of the clapper-box and to attain that objective, it is proposed to use a flexible power transmitting member, such as a Bowden mechanism, which is capable of transmitting the power around curves or bends to the mechanism L in the clapper-box.

The Bowden mechanism consists of an outer casing member formed of one or more strands of closely coiled wire, and an inner cable or wire element of a size sufficient to withstand the forces of compression and tension to which it is subjected during the transmission of the power. Relative axial movement between one end of the casing and inner cable causes a similar relative movement to occur at the other end of the mechanism and by means of which the power is transmitted. The Bowden mechanism selected for the present purpose is preferably of such size and construction as not to undergo any material shortening or lengthening when subjected to axial loads or when being curved or bent to suit the particular adjustment given to the tool.

In the present embodiment, the outer casing member 59 is clamped or otherwise secured to the bracketed sleeve 47, above referred to, and the other end to a fixed part of the ram adjacent the free end of the floating lever 54; sufficient slack being provided to allow the clapper-box to be tilted or adjusted to its extreme position. The wire or inner member 60 has one end clamped to the lever 54, as at 61, and the other end is clamped at 62 to a short lever 63 mounted on the outer end of the rock-shaft 49 of the clapper-box. The clamps 61 and 62 are easily adjusted so that the arcs of swing of the lever 54 and rock-shaft lever 63 may be properly related. Sufficient distance is provided between the points of clamping and the ends of the casing member 59 to permit freedom in the arcuate movement of the respective levers, without undue binding of the inner wire at the entrance of the flexible conduit.

When the parts are assembled and applied, the initial forward movement of the ram causes the friction shoe lever to swing clockwise and moves the wire 60 forward. The wire being reinforced its whole length, does not buckle and a corresponding movement occurs at the opposite end which moves the rock-shaft 49 clockwise. This movement rotates the actuating finger in a direction away from the pin 52 on the clapper, and the latter falls to its position against the bearing plate 41. Inertia of the clapper, tool post and tool, cooperate with gravity to return the clapper to its seat and properly positions the tool point before the cut actually starts.

At the start of the return stroke, the reverse action occurs, the friction block lags behind the movement of the ram and the wire 60 is pulled the other way. That movement oscillates the rock-shaft 49 counterclockwise, the lever 50 at the inner end engages the pin 52 and forcibly elevates the tool from the work. It will be observed that with the present construction, the operator may set the stroke of the ram so as to cut to a line if necessary, since the tool is elevated only as the ram recedes and thereafter positively restrained from falling upon the workpiece by virtue of the action of friction shoe, which never overtakes the ram except upon reversing. The length of the guide surface 57 is preferably coincident with the maximum length of ram stroke and whatever the range or length of stroke used, the friction-shoe mechanism automatically adjusts itself thereto and performs its intended functions.

It will be apparent also that the amount that the tool is to be lifted depends largely upon the depth of cut that is being taken. If the cut is relatively shallow the tool need be elevated slightly, if the cut is deep the tool must be elevated accordingly. An adjustment for this purpose is readily effected through the medium of the set screws 58. These screws are manually adjustable to limit the throw of the floating lever and in turn control the distance through which the clapper member and parts carried thereby are moved.

The present arrangement does not, it will be seen, encumber the tool head with bulky mechanisms, nor does it interfere with the elevating of the clapper-box manually at any time, as is frequently done by the operator when performing certain operations or when he wishes to examine the tool point.

In cases where it is desired not to use the automatic tool lifting device, it may be rendered ineffective by turning the thumb wheel 64 on the non-rotatable but axially movable shaft 65. As seen in Fig. 2, the shaft 65 is encircled by the compression spring 56 and has a floating connection with the tension lever 55. Hence, by adjusting the thumb wheel 64 downward the shaft is elevated and the tension on lever 55 which carries the friction shoe, relieved. Fig. 7 of the drawings illustrates the friction shoe fully disengaged from the machine frame, thus rendering the automatic tool lifting device ineffective as long as the operator elects.

For convenience in manufacture and installation on existing machines, the friction shoe mechanism is preferably constructed as a unit within a small housing 66 which may be bolted to the ram at the desired location.

Thus there is provided a tool lifting mechanism that occupies a minimum of the space available at the tool head, and a mechanism which is durable and reliable, automatically self-adjusting as to ram speed and length or the range of stroke as well as to the angular position and radial position the clapper-box may assume.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a machine tool device the combination of a supporting frame, a work support adjustable thereon, a tool carrier reciprocable on said frame, said carrier including a ram member, a tool head revolvable thereon, a tool slide translatable on said head, and a clapper-box mechanism mounted on said slide adapted to support a tool in operative relation with the work support, drive means for reciprocating said ram and for intermittently moving said work support laterally a unit distance between forward reciprocations of the tool, automatically operable means for raising the tool away from the work support on each return stroke thereof, including a tool lifting device mounted in said clapper-box and an actuating means carried by the ram in coacting relation with the machine frame; a substantially incompressible flexible power transmitting connection between said means and said lifting device for transmitting motion from the former to the latter around curves or bends depending upon the angular adjustment of said head on the ram or of said tool slide on the said head; and manually operable means for rendering said automatic means ineffective to raise the tool on the return reciprocations of said ram; and manual means electively available to raise said tool independently of said automatic means.

2. In a shaping machine the combination of a clapper-box mounted for vertical and angular adjustment on the forward end of the ram of the shaping machine, said clapper-box comprising a bearing plate member and a tool supporting clapper member pivoted thereto and adapted to swing into engagement with said plate at the start of the forward movement of the ram and away from said bearing plate at the end of the forward movement of the ram; means for holding said clapper member away from said bearing plate during the return movement of the ram whereby the tool is restrained from falling or back-tracking on the workpiece comprising an oscillatable member interposed between said clapper member and said bearing plate adapted when actuated to an effective position to interpose an abutment in the path of movement of said clapper member at the start of the return stroke of the ram positively holding said member a predetermined distance away from said bearing plate whereby the tool is definitely prevented from striking the workpiece, means for actuating said oscillatable member in timed relation with the reciprocatory movement of the ram comprising a lever member pivoted intermediate its ends to the side of the ram, a friction shoe carried by one end of said lever and cooperatively engaging a portion of the machine frame and operative to tilt said lever about its pivot at the start of each reverse movement of the ram, and power transmitting means between said friction shoe mechanism and said oscillatable member comprising a Bowden mechanism having the ends of its outer casing member fixedly secured relative to said lever and oscillatable members, and an axially movable inner member having its ends adjustably secured to said lever and oscillatable member respectively, said connections being so arranged that said abutment is interposed on the return movement of the ram and withdrawn at the start of the forward movement of the ram; and manually operable means for varying said predetermined distance to regulate the distance the tool is raised from the workpiece on the return stroke; and a second manually operable means for rendering said friction shoe mechanism ineffective to raise the tool.

3. A shaping machine combining a frame member; a work support adjustable thereon; a reciprocable ram member supported in guideways on the frame; means for varying the length of stroke of said ram; power means for reciprocating said ram and for moving said work support laterally a unit distance between forward strokes of the ram; a revolvable tool head mounted at the forward end of said ram; a tool slide mounted for adjustment diametrically on said tool head; a clapper-box mechanism mounted on said slide for supporting the cutting tool in cooperative relation with the work support, said clapper-box comprising a bearing plate element and a tool supporting clapper element hinged thereto; and means automatically operative at all lengths of ram stroke and in all positions of adjustment of said clapper-box for automatically swinging said clapper element about the axis of its hinge on the return stroke of the ram; comprising a rockshaft journaled in said bearing plate member on an axis parallel to the axis of said hinge and spaced therefrom, a cam element on said shaft underlying said clapper element and adapted when said shaft is actuated to an effective position to engage and swing said clapper on its hinge away from the bearing plate element thereby to elevate the tool, means operative at the outer end of said shaft for actuating said shaft in timed relation with the reciprocation of said ram, comprising a friction block element pivoted to said ram and operatively engaging a portion of the machine frame, a lever actuated by said friction block, at the beginning of each stroke of the ram, and a flexible power transmitting connection between said lever and said rock-shaft for actuating the latter; and manually operable means for rendering said automatic means selectively effective or ineffective.

4. A shaping machine having a frame, a ram reciprocable thereon, an angularly adjustable tool head at the forward end of the ram, and a clapper-box adjustable radially on said head adapted to support a cutting tool, said clapper-box including a bearing plate member and a tool supporting clapper member pivoted thereto and normally bearing against said bearing plate member, combining means for swinging said clapper member about its pivot comprising a shaft member interposed between said bearing plate member and said clapper member and spaced from the axis of said pivot, a clapper actuating element carried by said shaft adapted when said shaft is actuated to an effective position to engage and move said clapper member about its pivot thereby to lift the tool supported thereby away from the workpiece; means for actuating said shaft cyclically to an effective and ineffective position comprising a friction shoe, a lever pivoted intermediate its ends to the side of said ram for supporting said shoe in cooperative relation with the machine frame, said friction shoe being operative to swing said lever about its pivot at each reversal in ram movement, and a flexible connection between the free end of said lever and said shaft operative to transmit the motion of said lever to said shaft thereby to actuate said shaft alternately to an effective and ineffective position, said flexible transmitting means being operative to transmit the said motion to said shaft around curves or bends as determined by the radially adjusted position of said clapper-box on said head or the position of angular adjustment of said head relative to said ram.

5. In a shaping machine having a reciprocable ram and means for reciprocating same the combination of a clapper-box mounted for vertical and angular adjustment on the forward end of the ram, said clapper-box comprising a bearing plate member and a tool supporting clapper member pivoted thereto and adapted to swing into engagement with said bearing plate at the start of the forward movement of the ram and away from said bearing plate at the end of the forward movement of the ram; means for holding said clapper member away from said bearing plate during the return movement of the ram whereby the tool is restrained from falling or back-tracking on the workpiece comprising a member interposed between said clapper member and said bearing plate adapted when actuated to an effective position to interpose an abutment in the path of movement of said clapper member at the start of the return stroke of the ram positively holding said member a predetermined distance away from said bearing plate whereby the tool is definitely prevented from contacting with the workpiece on its return movement; means for actuating said member in timed relation with the reciprocatory movement of the ram comprising a lever member pivoted intermediate its ends to the side of the ram, a friction-shoe carried by one end of said lever and cooperatively engaging a portion of the machine frame and operative to tilt said lever about its pivot at the start of each reverse movement of the ram, and flexible power transmitting means between said friction-shoe mechanism and said member comprising a flexible outer casing member fixedly secured relative to said lever and oscillatable members, and a flexible axially movable inner member having its ends secured to said lever and oscillatable member respectively operative around curves or bends to actuate said member to an effective position on the return movement of the ram and to an ineffective position at the start of the forward movement of the ram.

6. In a shaping machine tool the combination of a work support; a supporting frame; a tool carrier reciprocably mounted on said frame; a tool head revolvably mounted on said carrier including a clapper box mechanism adapted to support a tool in operative relation with a workpiece as said carrier is reciprocated; power means for reciprocating said carrier on said frame; means for raising the tool away from the work support at the start of each return stroke of the said carrier including a tool lifting device mounted on said clapper box and mechanical means deriving power from the relative reciprocatory movement between said carrier and supporting frame for actuating said lifting device, said mechanical means including a movable member carried bodily by the said carrier and normally engaging said frame in all positions of said carrier on said frame and moved thereby at the start of the return stroke of the ram, and a flexible mechanical connection between said actuating member and said lifting device operative in all positions of adjustment of said head member relative to the reciprocating carrier for transmitting the movement of said movable element to said tool lifting device in timed relation with the reciprocatory movements of the carrier.

7. A tool lifting device for a shaper combining a supporting frame member; ram guideways formed upon said frame; a ram member reciprocably mounted in said guideways; said frame member also being provided with a substantially smooth surface extending parallel to the said ram guideways; a clapper box mechanism adjustably mounted on said ram for supporting a tool in cooperative relation to the work as the ram is reciprocated including a bearing plate member and a tool supporting clapper member pivoted thereto; a tool lifting device carried by said clapper mechanism for lifting the clapper element away from its bearing plate on the return strokes of the ram; actuating means comprising an oscillatable lever pivoted to the ram in cooperative relation with said substantially smooth surface on the machine frame and actuated thereby at the start of the return stroke of the ram, and a flexible and substantially incompressible mechanical connection between the free end of said oscillatable lever and said lifting device for mechanically transmitting the motions of the former to the latter around curves or bends as determined by the adjustment of said clapper box on said ram; and means for limiting the oscillatory motion of said lever thereby to control the distance said clapper member is elevated.

WILLIAM F. ZIMMERMANN.